(12) United States Patent
Lee (10) Patent No.: US 8,155,507 B2
(45) Date of Patent: Apr. 10, 2012

(54) VIDEO DEVICE HAVING PRIORITY-BASED RECORDING FUNCTION AND CONTROL METHOD FOR THE SAME

(75) Inventor: Mun Youl Lee, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 1570 days.

(21) Appl. No.: 11/357,942

(22) Filed: Feb. 22, 2006

(65) Prior Publication Data

US 2006/0188221 A1  Aug. 24, 2006

(30) Foreign Application Priority Data

Feb. 22, 2005  (KR) .................... 10-2005-0014476

(51) Int. Cl.
*H04N 5/76* (2006.01)
*H04N 5/92* (2006.01)
(52) U.S. Cl. ..................... 386/291; 386/326
(58) Field of Classification Search ........... 386/46
See application file for complete search history.

(56) References Cited

U.S. PATENT DOCUMENTS 6,185,360 B1 * 2/2001 Inoue et al. ............... 386/46
6,970,637 B1 * 11/2005 Yoshida ..................... 386/46
7,369,750 B2 * 5/2008 Cheng et al. ............... 386/83

FOREIGN PATENT DOCUMENTS

KR  10-1998-056948 A  9/1998

* cited by examiner

*Primary Examiner* — William C Vaughn, Jr.
*Assistant Examiner* — Asher Khan
(74) *Attorney, Agent, or Firm* — Birch, Stewart, Kolasch & Birch, LLP

(57) ABSTRACT

A video device having a priority-based recording function and a control method for the same are disclosed in which timer recording is performed based on user preferences. First, recording priority of a specific program for timer or immediate recording is set. When the time to perform the timer or immediate recording is reached, it is determined whether or not at least one program preset for timer recording, which has a higher recording priority than the specific program and which have not yet been recorded, is present. If the at least one program is present, the sum of a memory capacity required for the specific program and a memory capacity required for the at least one program is compared with an available memory capacity of the video device. The specific program is recorded if the sum of the memory capacities is less than or equal to the available memory capacity.

23 Claims, 5 Drawing Sheets

```
              MENU
[Q] To set timer or immediate recording?   [Yes ▼]
                                           [No   ]

[Q] Recording priority setting mode?       [Automatic ▼]
                                           [Manual    ]
```

FIG. 4

| Recording prioiry setting | | | | | | |
|---|---|---|---|---|---|---|
| Program title | channel | recording start time | Total recording time | Image quality | Recording priority | Recorded or not |
| Program 1 | 7-1 | 9/3, 11:10 PM | 60 min | SD | 3 | X |
| Program 2 | 11-1 | 9/14, 09:30 PM | 30 min | SD | 2 | |
| Program 3 | 11-1 | 9/14, 07:30 PM | 120 min | HD | 6 | |
| Program 4 | 7-2 | 9/6, 08:00 PM | 30 min | SD | 5 | |
| Program 5 | 9-1 | 9/7, 11:30 PM | 80 min | HD | 4 | |
| Program 6 | 6-1 | 9/7, 09:30 PM | 90 min | SD | 1 | |

FIG. 5

| Recording prioiry setting |
|---|

Program title : Program 6

Channel : 11-2

Recording start time : 2006/01/29, 03:30 PM

Total recording time : 70 min

Image quality : HD

Recording priority : 1

FIG. 6

FAILED!!

(Recording of program 4 has failed due to shortage of memory)

FIG. 7

VIDEO DEVICE HAVING PRIORITY-BASED RECORDING FUNCTION AND CONTROL METHOD FOR THE SAME

This application claims the benefit of the Korean Patent Application No. 10-2005-0014476, filed on Feb. 22, 2005, which is hereby incorporated by reference as if fully set forth herein.

BACKGROUND OF THE INVENTION

1. Field of the Invention

The present invention relates to a video device, and more particularly, to a video device having a priority-based recording function and a method for controlling the same.

2. Discussion of the Related Art

Conventional video devices generally serve only to output a broadcast signal in real time or to output data input from an external device.

Recently, a video device having a video recording function, which allows the user to record A/V data and then to reproduce the recorded data when needed, has been introduced with the technical development of video devices.

Video devices having the video recording function include a Personal Video Recorder (PVR), a Portable Multimedia Player (PMP), a television having a video recording function, and a mobile phone having a video recording function.

For example, PVRs having a hard disk with about 120 GB of storage capacity can record about 13 hours of a High Definition (HD)-level program or can record about 42-53 hours of a Standard Definition (SD)-level program.

PVRs are advantageous over Video Tape Recorders (VTRs) in that they can record much more video data over a longer time than VTRs can record with a single tape.

Some video devices such as PVRs also have a timer recording function.

Such video devices allow users to set timer recording for one or more programs.

When the time to broadcast the programs set for timer recording is reached, the video device immediately starts recording the programs set for timer recording, and, when the recording is completed, the video device stores the recorded program in a memory provided in the video device.

However, the conventional video device having the video recording function and the conventional method for controlling the same have the following problems.

First, the conventional video device performs recording of programs set for timer recording based only on recording start times preset for the programs, regardless of different preferences of the user for the programs. Thus, when the video device is short of memory, the user may fail to record even the most preferred program.

If the user performs immediate recording of a currently viewed program after setting timer recording of one or more programs, an available memory space of the video device after the immediate recording is completed will differ from the available memory space at the moment when the timer recording was set.

Thus, the user may fail to record some programs set for timer recording due to a memory space being occupied by the immediately recorded program although the user set timer recording of the programs after confirming that the available memory space is sufficient.

Particularly, the user may fail to record the most preferred program since the time to record the most preferred program has been set as the last among the programs registered in the timer recording program list.

The conventional video device having the video recording function also has the following problem. In order to determine if it is possible to record the most preferred one of the programs registered in the timer recording program list, it is necessary for the user themselves to calculate memory spaces required for the programs and an available memory space of the video device and then to rearrange (for example, delete and move) data items in a hard disk of the video device to secure a memory space required to record desired programs up to the most preferred program based on the calculated memory spaces.

SUMMARY OF THE INVENTION

Accordingly, the present invention is directed to a video device having a priority-based recording function and a method for controlling the same that substantially obviate one or more problems due to limitations and disadvantages of the related art.

An object of the present invention is to provide a video device having a priority-based recording function and a method for controlling the same, wherein one or more programs set for timer recording are recorded according to preferences of the user for the programs when an available memory capacity of the video device is insufficient.

Another object of the present invention is to provide a video device having a priority-based recording function and a method for controlling the same, wherein the respective recording priorities of programs are accurately determined automatically even when the priorities of the programs have not been input by the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a video device having a priority-based recording function includes the steps of a) setting a recording priority of a specific program for timer or immediate recording; b), when the time to perform the timer or immediate recording of the specific program has been reached, determining whether or not at least one program, which has a higher recording priority than the specific program and which has not yet been recorded, is present; c), if the determination of the step b) is that at least one program, which has a higher recording priority than the specific program and which has not yet been recorded, is present, comparing the sum of a memory capacity required for the specific program and a memory capacity required for the at least one program with an available memory capacity of the video device; and d) recording the specific program if the comparison of the step c) is that the sum of the memory capacity required for the specific program and the memory capacity required for the at least one program is less than or equal to the available memory capacity of the video device.

In another aspect of the present invention, a video device having a priority-based recording function includes a setting unit that sets a recording priority of a specific program for timer or immediate recording; a determination unit that, when the time to perform the timer or immediate recording of the specific program has been reached, determines whether or not at least one program, which has a higher recording priority than the specific program and which has not yet been recorded, is present; a comparison unit that, if the determination of the determination unit is that at least one program, which has a higher recording priority than the specific program and which has not yet been recorded, is present, compares the sum of a memory capacity required for the specific program and a memory capacity required for the at least one program with an available memory capacity of the video device; and a controller that records the specific program if the comparison of the comparison unit is that the sum of the memory capacity required for the specific program and the memory capacity required for the at least one program is less than or equal to the available memory capacity of the video device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

According to the present invention, programs preferred by the user are preferentially recorded in a video device having a limited memory capacity, thereby achieving efficient use of the memory space of the video device. Further, the video device can automatically determine the programs preferred by the user, thereby providing a great convenience to the user.

For a better understanding of the present invention, the following description will be separated into a description of the components of a video device having a priority-based recording function according to a first embodiment, a description of a method for controlling the video device having the priority-based recording function according to a second embodiment, a description of a method for setting recording priorities according to a third embodiment, and a description of a method for displaying information about programs for which timer recording cannot be performed according to a fourth embodiment.

—First Embodiment—

Figure 1:
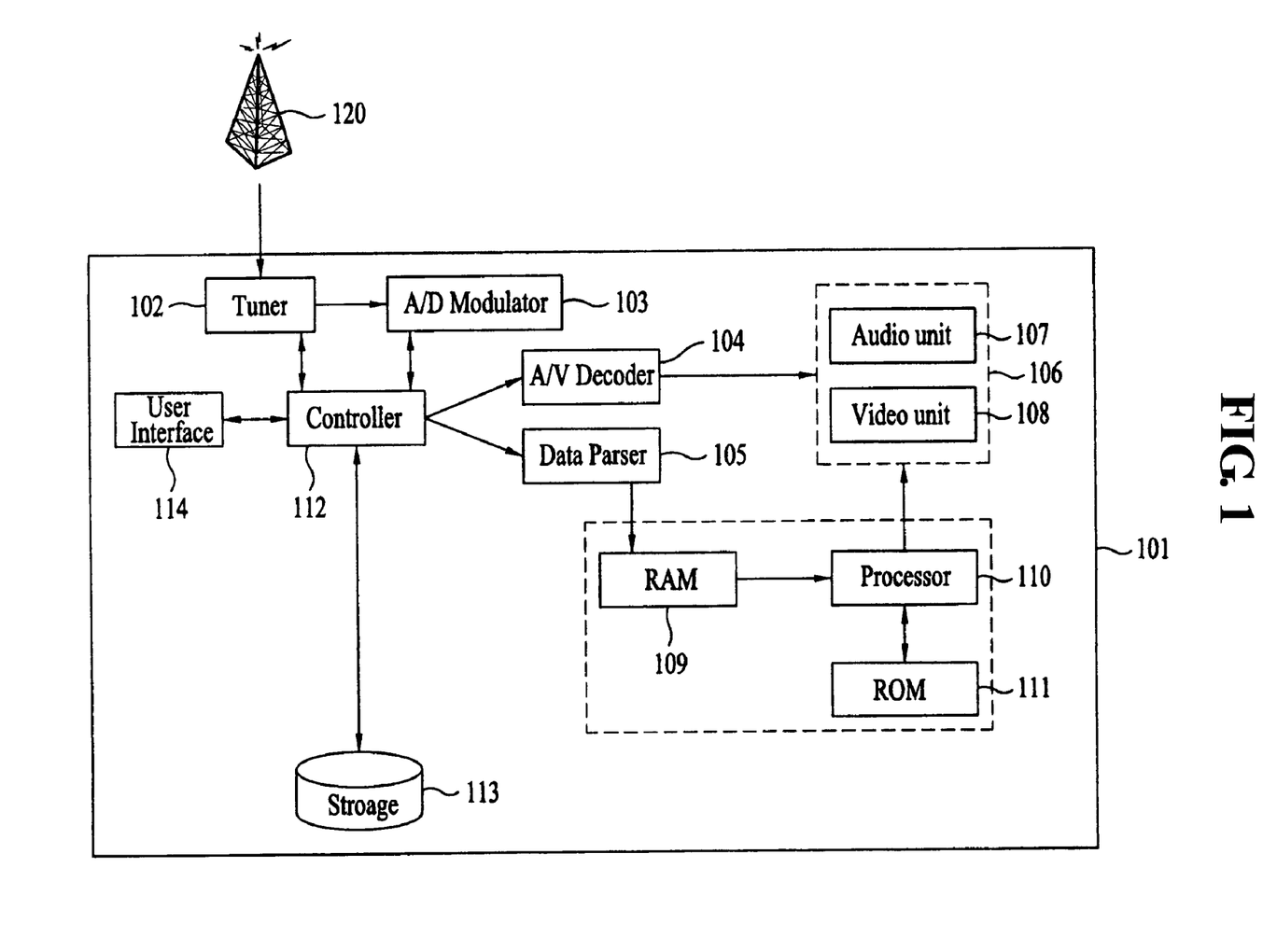
FIG. 1 is a block diagram of a video device having a priority-based recording function according to the present invention.

FIG. 1 is a block diagram of a video device having a priority-based recording function according to the present invention.

As shown in FIG. 1, a video device 101 having a priority-based recording function according to the present invention includes a tuner 102, an A/D modulator 103, an A/V decoder 104, a data parser 105, an A/V unit 106, an audio unit 107, a video unit 108, a RAM 109, a processor 110, a ROM 111, a controller 112, a storage 113, and a user interface 114.

The video device 101 preferably has a video recording function. Examples of the video device 101 include a Personal Video Recorder (PVR), a Portable Multimedia Player (PMP), a television having a video recording function, and a mobile phone having a video recording function.

The video device 101 can receive a variety of programs from a broadcast transmitter 120 and then output or store the received programs in real time.

Examples of the broadcast transmitter 120 include a terrestrial broadcast station, a cable broadcast station, and a satellite broadcast station.

The broadcast transmitter 120 transmits audio information, video information, and data of additional information of a program for transmission.

The tuner 102 in the video device 101 receives the audio information, the video information, and the data of the additional information of the program transmitted from the broadcast transmitter 120.

The A/D modulator 103 converts the audio information, the video information, and the data of the additional information of the program received through the tuner 102 into a digital Transport Stream (TS) and then transfers the TS to the controller 112.

Upon receiving the TS, the controller 112 transfers data of the TS associated with the audio and video information to the A/V decoder 104 and transfers data of the TS associated with the data of the additional information of the program to the data parser 105.

The controller 112 may store TS data associated with audio and video information of a specific program in the storage 113 upon receiving a command to perform immediate or timer recording of the specific program through the user interface 114.

Thereafter, when a command to reproduce the specific program stored in the storage 113 is input through the user interface 114, the controller 112 transfers the TS data of the specific program stored in the storage 113 to the A/V decoder 104 and allows the specific program to be output through the A/V unit 106.

The user interface 114 is a component that can transfer a user command regarding the video unit 101 to the controller 112. Examples of the user interface 114 include a remote controller and a Local Key button provided on the video unit 101.

The storage 113 may be a memory that can store data. Examples of the storage 113 include a hard disk drive (HDD).

The A/V decoder 104 decodes TS data associated with audio and video information of a broadcast program or the like and transfers the decoded TS data to the A/V unit 106.

Upon receiving the decoded TS data, the A/V unit 106 displays the audio and video information of the broadcast program or the like.

The A/V unit 106 may include the audio unit 107 and the video unit 108. An example of the audio unit 107 is a speaker and an example of the video unit 108 is a screen of the video device 101.

The data parser 105 stores the data of the additional information of the program in the RAM 109.

The data stored in the RAM 109 serves as a database for a routine that activates a program guide stored in the ROM 111.

The term "routine" may refer to a basic unit of a program including a series of instructions arranged in a specific order to perform a specific function in a computer or the like.

The processor 110 calls a routine stored in the ROM 111, and the called routine controls an On Screen Display (OSD) using data stored in the RAM 109.

Although only one tuner 102 is illustrated in FIG. 1, the video device 101 may be designed to have two or more tuners 102. When two or more tuners 102 are included in the video device 101, the user may watch two or more channels simultaneously and may also record a broadcast program of one channel while watching another channel.

In the present invention, recording priorities may be input through the user interface 114 or be automatically set according to determination of the controller 112.

When a memory capacity that will be occupied by the programs to be recorded exceeds the available memory capacity of the storage 113, the controller 112 controls the video device 101 to perform or not to perform the timer recording process of each of the programs set for timer recording according to the recording priorities of the programs rather than according to the recording start times of the programs.

This procedure will be described in more detail with reference to FIG. 2 in the second embodiment of the present invention.

—Second Embodiment—

Figure 2:
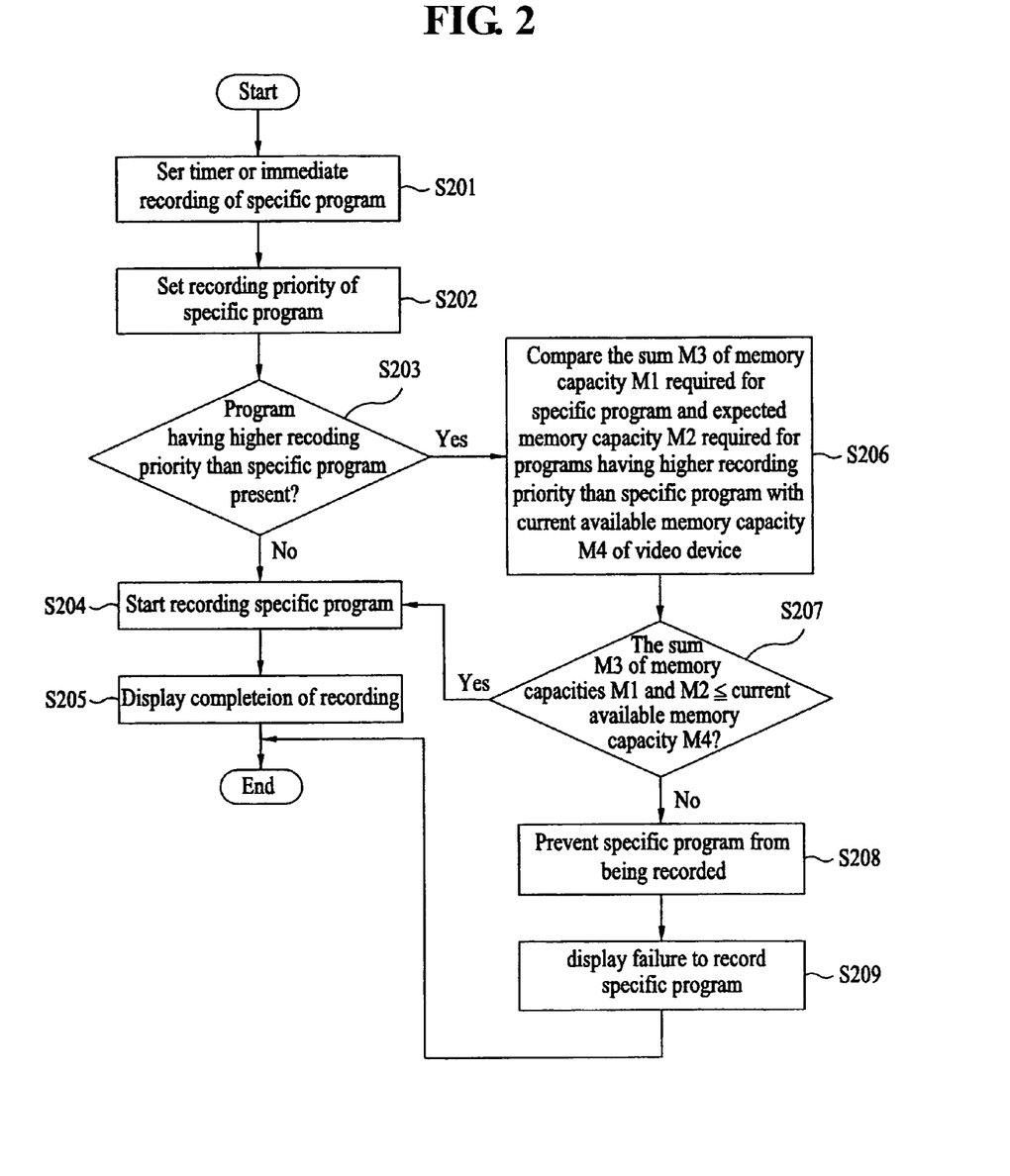
FIG. 2 is a flow chart of a method for controlling a video device having a priority-based recording function according to the present invention.

FIG. 2 is a flow chart of a method for controlling a video device having a priority-based recording function according to the present invention.

Figure 4:
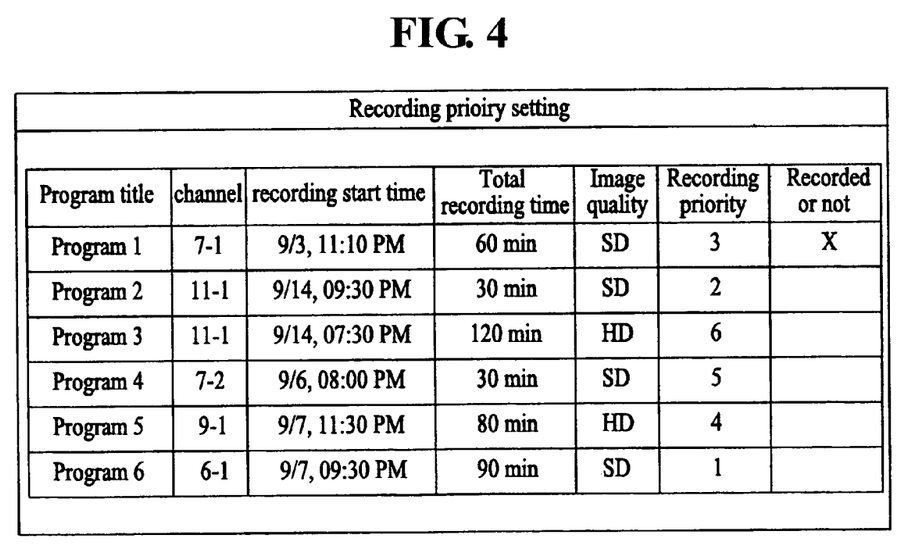
FIG. 4 illustrates an example screen for setting the priorities of programs for timer recording according to the present invention.

FIG. 4 illustrates an example screen for setting the priorities of programs for timer recording according to the present invention.

The control method of the video device having the priority-based recording function will now be described with reference to the flow chart of FIG. 2 in conjunction with FIG. 4.

First, a command to set a timer or immediate recording of a specific program is input to the video device 101 through the user interface 114 (S201).

Contrary to the conventional method, a recording priority is set for each of the programs for timer or immediate recording (S202).

At the step S202 of setting the recording priorities, the user may input the recording priorities through the user interface 114 or the controller 112 may automatically determine the recording priorities.

The step S202 of setting the recording priorities will be described in more detail in the third embodiment.

When the time to perform immediate or timer recording of a specific program is reached, the controller 112 determines whether or not a program set for timer recording, which has a higher recording priority than the specific program and which has not yet been recorded, is present (S203).

Information of the respective recording priorities of one or more programs for timer recording may be stored in the storage 113.

When the determination of step S203 is that no program for timer recording, which has a higher recording priority than the specific program and which has not yet been recorded, is present, the controller 112 starts recording of the specific program for which the time to perform the immediate or timer recording has been reached (S204).

When the recording (S204) has been completed, the controller 112 may display information indicating that the recording of the specific program has been completed, immediately after the completion, or may display a list of programs for timer recording together with the information (S205).

On the other hand, when the determination of step S203 is that a program for timer recording, which has a higher recording priority than the specific program and which has not yet been recorded, is present, the controller 112 calculates an expected memory capacity M1 required for the specific program.

The controller 112 also calculates an expected memory capacity M2 required for programs for timer recording, which have a higher recording priority than the specific program and which have not yet been recorded.

The controller 112 then compares an available memory capacity M4 of the video device 101 with a memory capacity M3 that is the sum of the expected memory capacity M1 and the expected memory capacity M2 (S206).

Here, the available memory capacity M4 may indicate a memory capacity obtained by subtracting the currently used memory capacity from the total memory capacity of the video device 101.

The calculation of the memory capacities M1, M2, M3, and M4 may be performed taking into account information of a recording duration, a recording image quality, and a data compression ratio of the specific program.

This is because even the same program may occupy a different memory capacity of the storage 113 depending on the recording duration, the recording image quality, and the data compression ratio of the program.

Based on the comparison of step S206, it is determined whether or not the memory capacity M3, which is the sum of the expected memory capacity M1 required for the specific program, for which the time to perform the immediate or timer recording has been reached, and the expected memory capacity M2 required for the programs for timer recording which have a higher recording priority than the specific program and which have not yet been recorded, is less than or equal to the current available memory capacity M4 of the video device 101 (S207).

If the determination of step S207 is that the memory capacity M3 is less than or equal to the memory capacity M4, the controller 112 performs the above steps S204 and S205.

If the determination of step S207 is that the memory capacity M3 exceeds the memory capacity M4, the controller 112 prevents recording the specific program for which the time to perform the immediate or timer recording has been reached (S208).

The controller 112 then outputs a warning message indicating that the specific program, for which the time to perform the immediate or timer recording has been reached, has not been recorded or that the specific program cannot be recorded (S209).

The step S209 of outputting the warning message will be described later in more detail in the fourth embodiment.

A more easily understood description of the video device control method shown in FIG. 2 is given below under the assumption that recording priorities of programs for timer recording have been set as illustrated in FIG. 4.

Specifically, in the following description, it is assumed that timer recording has been set for Programs 1 to 6 and recording priorities of the Programs 1 to 6 have also been set as shown in FIG. 4.

When the time to start recording the Program 1, which is the first to be recorded of the six programs set for timer recording, is reached, the controller 112 searches for a program that has a higher recording priority than the Program 1.

In the example of FIG. 4, the Programs 2 and 6 have a higher recording priority than the Program 1.

Thus, the controller 112 calculates memory capacities to be occupied by the Programs 2 and 6. The controller 112 may calculate the memory capacities of the programs taking into account the recording durations, recording image qualities, data compression ratios, etc., of the programs.

Recording a program of about 1 hour requires a memory capacity of about 10 GB if it is an HD-level program and requires a memory capacity of about 3.5 GB if it is an SD-level program.

The controller 112 also calculates an expected memory capacity of the Program 1 that is now to be recorded.

The controller 112 starts recording the Program 1 if a memory capacity, which is the sum of the memory capacity required for the Program 1, the memory capacity required for the Program 2, and the memory capacity required for the Program 6, is less than or equal to the current available memory capacity of the storage 113 of the video device 101.

The controller 112 prevents the Program 1 from being recorded if the memory capacity, which is the sum of the memory capacity required for the Program 1, the memory capacity required for the Program 2, and the memory capacity required for the Program 6, is greater than the current available memory capacity of the storage 113 of the video device 101.

Thereafter, the controller 112 repeats the above procedure when the time to start recording the Program 2 is reached.

—Third Embodiment—

Figure 3:
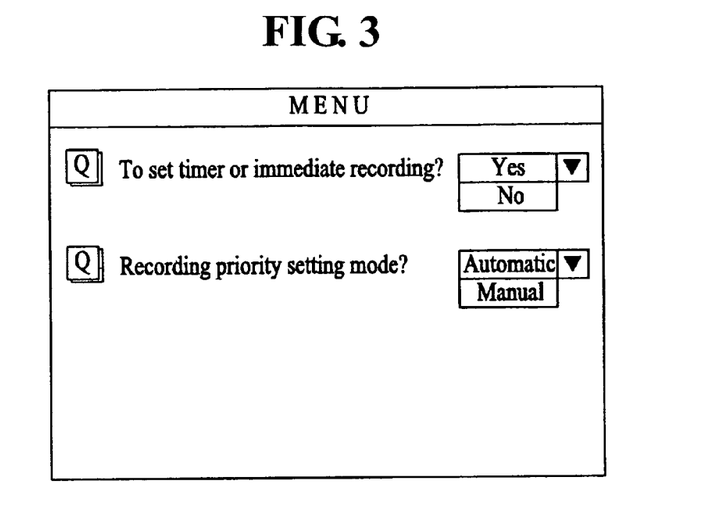
FIG. 3 illustrates an example screen for setting the recording priorities of programs for timer recording according to the present invention.

FIG. 3 illustrates an example screen for setting the recording priorities of programs for timer recording according to the present invention.

FIG. 4 illustrates another example screen for setting the recording priorities of programs for timer recording according to the present invention.

Figure 5:
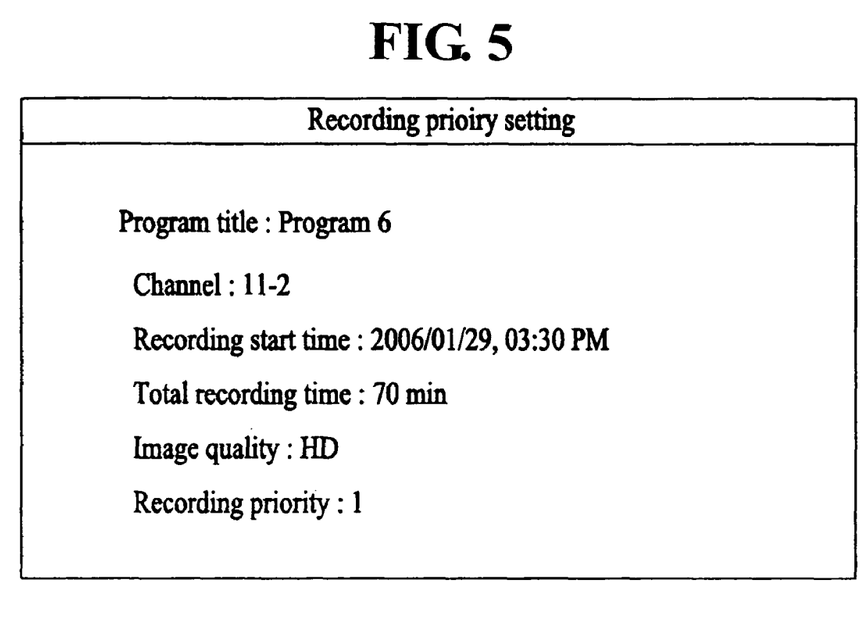
FIG. 5 illustrates another example screen for setting the recording priorities of programs for timer recording according to the present invention.

FIG. 5 illustrates another example screen for setting the recording priorities of programs for timer recording according to the present invention.

A detailed method for setting recording priorities according to the present invention will now be described with reference to FIGS. 3-5.

As shown in FIG. 3, when a timer or immediate recording has been set, either an automatic or manual mode can be selected as the method for setting recording priorities.

When the manual mode has been set, the user can set the respective recording priorities of programs through the user interface 114, and the set recording priorities are then stored in the storage 113 under the control of the controller 112.

For example, the controller 112 displays a list of all programs set for timer recording on the screen as shown in FIG. 4 so that, with reference to the displayed screen, the user can input a command to set the recording priority of each of the programs through the user interface 114.

The controller 112 may also be designed to display the information of a program set for immediate or timer recording and to allow the user to set the recording priority of the program through the user interface 114 as shown in FIG. 5.

In this case, if the currently input recording priority is equal to any preset recording priority, the controller may be designed to lower each preset recording priority lower than the currently input recording priority by one level or to output a message indicating the equality.

On the other hand, the user has no need to directly input the recording priority as shown in FIGS. 4 and 5 if the automatic mode has been set as the method for setting recording priorities on the screen shown in FIG. 3.

Specifically, when the automatic mode has been set as the method for setting recording priorities, the controller 112 can set the recording priorities of one or more programs set for timer recording based on the information stored in the storage 113 or the like.

The information stored in the storage 113 or the like may include information of genres, recording start times, ratings, and the like.

For example, a database regarding the number of times programs have been recorded for each genre can be produced under the control of the controller 112.

The controller 112 may associate a higher recording priority with a genre, programs of which have been recorded a greater number of times.

For example, when "sports" programs have been recorded 24 times, "movie" programs have been recorded 12 times, and "documentary" programs have been recorded 3 times, the controller 112 is designed to give a 1st (i.e., highest) recording priority to sports-related programs set for timer recording, a 2nd (i.e., normal) recording priority to movie-related programs set for timer recording, and a 3rd (i.e., lowest) recording priority to documentary-related programs set for timer recording.

If the number of times which "sports" programs have been recorded is same with the number of times which "movie" programs have been recorded, the recording priority is set by user's selection (for example, the User Interface 114), or is set randomly by the controller 112.

In addition, when there are at least two programs set for timer recording which have the same genre, the controller 112 is designed to set the recording priority automatically by more specialized database.

For example, the more specialized database means the information regarding the number of times which "action movie" programs have been recorded, the number of times which "thriller movie" programs have been recorded, the number of times which "comedy movie" programs have been recorded, and the number of times which "adult movie" programs have been recorded.

Setting the automatic mode as the method for setting recording priorities increases user convenience, whereas setting the manual mode allows the user to set the recording priorities more correctly.

—Fourth Embodiment—

Figure 6:
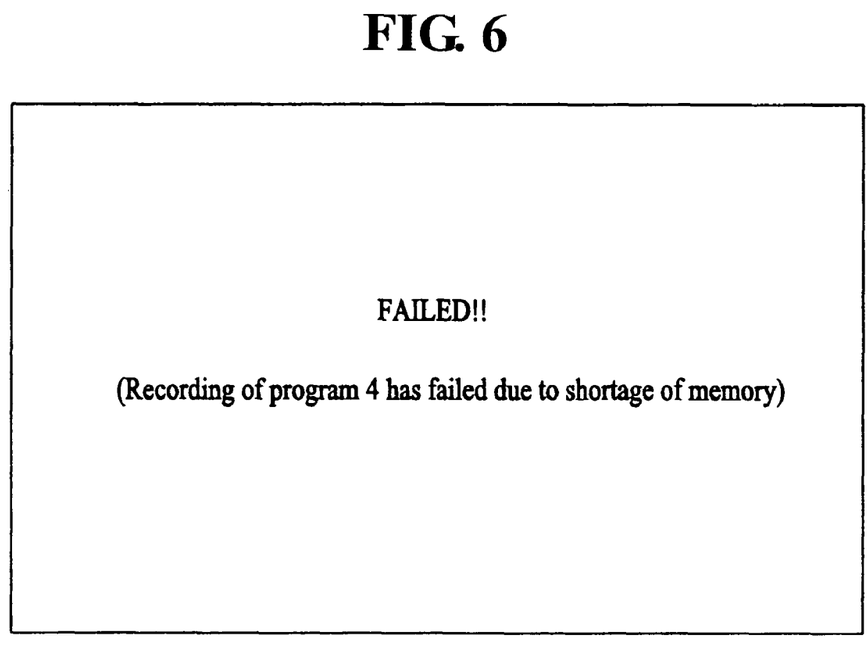
FIG. 6 illustrates an example screen for displaying a warning message indicating that a program set for timer recording cannot be recorded, according to the present invention.

FIG. 6 illustrates an example screen for displaying a warning message indicating that a program set for timer recording cannot be recorded, according to the present invention.

Figure 7:
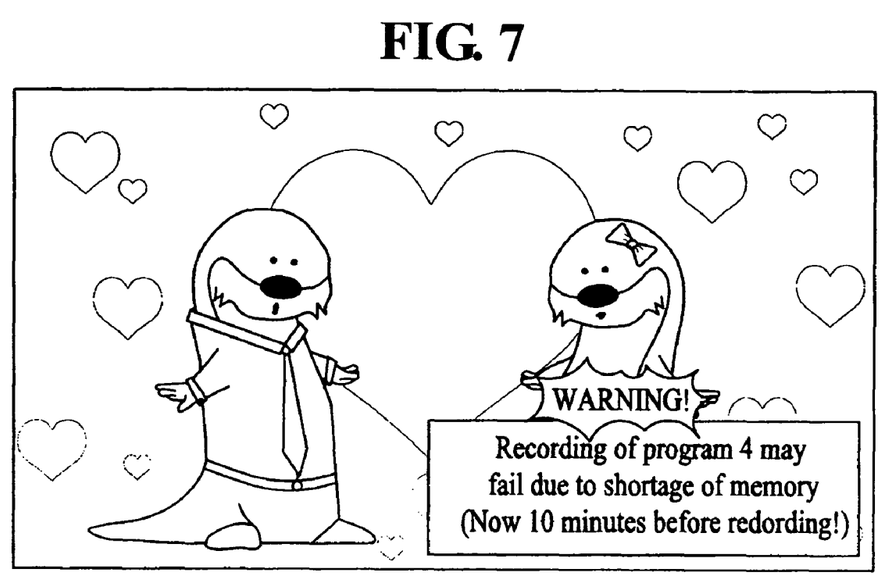
FIG. 7 illustrates another example screen for displaying a warning message indicating that a program set for timer recording cannot be recorded, according to the present invention.

FIG. 7 illustrates another example screen for displaying a warning message indicating that a program set for timer recording cannot be recorded, according to the present invention.

A detailed method for displaying information of a program for which timer recording cannot be performed according to the present invention is described below with reference to FIGS. 6 and 7.

In the method illustrated in FIG. 6, information indicating failure to record the Program 4 is displayed on the screen when, based on the memory capacity determination method described above in the first to third embodiments, it is determined that the Program 4 cannot be recorded although the time to record the Program 4 has been reached.

In the method illustrated in FIG. 7, a warning message indicating that the Program 4 may not be recorded is output when it is determined that the Program 4 cannot be recorded.

The method of FIG. 7 differs from that of FIG. 6 in that the warning message is output before the time to start recording the Program 4 (for example, 10 minutes before the start time), thereby giving the user a chance to change the recording priorities or to rearrange data items in the storage 113 to secure a required memory space.

The method of FIG. 6 or 7 may provide the information to the user using a Picture In Picture (PIP) or Picture Out Picture (POP) technique or by voice.

As is apparent from the above description, the present invention provides a video device having a priority-based recording function and a method for controlling the same, wherein one or more programs set for timer recording are recorded according to preferences of the user for the programs when an available memory capacity of the video device is insufficient, thereby more efficiently using the memory.

In addition, the respective recording priorities of programs are accurately determined automatically even when the priorities of the programs have not been input by the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a video device having a priority-based recording function, the method comprising the steps of:
    a) setting a recording priority of a specific program for timer recording or immediate recording according to a received recording priority mode command;
    b) when a time to perform the timer recording or immediate recording of the specific program has been reached, determining whether or not at least one program, which has a higher recording priority than the specific program and which been recorded is recorded after the time, is present among programs for timer recording so as to produce a determination result;
    c) if the determination result indicates that the at least one program is not present among the programs for timer recording, recording the specific program;
    d) if the determination result indicates that the at least one program is present among the programs for timer recording, comparing a sum of a memory capacity required for the specific program and a memory capacity required for the at least one program with an available memory capacity of the video device so as to produce a comparison result; and
    e) recording the specific program if the comparison result indicates that the sum of the memory capacity required for the specific program and the memory capacity required for the at least one program is less than or equal to the available memory capacity of the video device,
        wherein a recording priority mode is changed between one of an automatic mode and a manual mode according to the received recording priority mode command.

2. The method according to claim 1, wherein the step a) comprises:
    displaying information of a recording priority of at least one program preset for timer recording; and
    determining a recording priority of the specific program using the displayed information.

3. The method according to claim 1, wherein the step a) includes a step of determining a recording priority of the specific program using additional information of the specific program and at least one program preset for timer recording.

4. The method according to claim 3, wherein the additional information includes genre information of the program.

5. The method according to claim 4, wherein the step a) comprises:
    producing a database regarding a number of times programs have been recorded for each genre;
    associating a higher recording priority with a genre, programs of which having been recorded a greater number of times; and
    determining a recording priority of the specific program according to the genre of the specific program.

6. The method according to claim 1, wherein the step d) includes a step of calculating a memory capacity of each program using information of a recording duration thereof.

7. The method according to claim 6, wherein the step d) further includes a step of calculating the memory capacity of each program by additionally using information of at least one of a recording image quality and a compression ratio thereof.

8. The method according to claim 1, wherein the step e) includes a step of preventing the specific program from being recorded if the comparison result indicates that the sum of the memory capacity required for the specific program and the memory capacity required for the at least one program exceeds the available memory capacity of the video device.

9. The method according to claim 8, wherein the step e) further includes a step of outputting a warning message indicating that the specific program has not been recorded.

10. The method according to claim 1, wherein the video device includes a memory configured to store a program.

11. The method according to claim 1, wherein the video device is a Personal Video Recorder (PVR).

12. A video device having a priority-based recording function, the video device comprising:
    a setting unit configured to set a recording priority of a specific program for timer recording or immediate recording according to a received recording priority mode command;
    a determination unit configured to determine, when a time to perform the timer recording or immediate recording of the specific program has been reached, whether or not at least one program, which has a higher recording priority than the specific program and which is recorded after the time, is present among programs for timer recording, and to generate a corresponding determination result;
    a comparison unit configured to compare, if the determination result indicates that the at least one program is present among the programs for timer recording, a sum of a memory capacity required for the specific program and a memory capacity required for the at least one program with an available memory capacity of the video device and to generate a corresponding comparison result; and
    a controller configured to record the specific program if the at least one program is not present among the programs for timer recording, record the specific program if the comparison result indicates that the sum of the memory capacity required for the specific program and the memory capacity required for the at least one program is less than or equal to the available memory capacity of the video device, wherein a recording priority mode is changed with one of an automatic mode and a manual mode according to the received recording priority mode command.

13. The video device according to claim 12, further comprising:

a display unit configured to display information of a recording priority of at least one program preset for timer recording.

14. The video device according to claim 13, wherein the setting unit is configured to determine a recording priority of the specific program using the displayed information.

15. The video device according to claim 12, wherein the setting unit is configured to determine a recording priority of the specific program using additional information of the specific program and at least one program preset for timer recording.

16. The video device according to claim 15, wherein the additional information includes genre information of the program.

17. The video device according to claim 16, wherein the setting unit is configured to produce a database regarding a number of times programs have been recorded for each genre, associate a higher recording priority with a genre, programs of which have been recorded a greater number of times, and determine a recording priority of the specific program according to the genre of the specific program.

18. The video device according to claim 12, wherein the comparison unit is configured to calculate a memory capacity of each program using information of a recording duration thereof.

19. The video device according to claim 18, wherein the comparison unit is configured to calculate the memory capacity of each program by additionally using information of at least one of a recording image quality and a compression ratio thereof.

20. The video device according to claim 12, wherein the controller is configured to prevent the specific program from being recorded if the comparison result indicates that the sum of the memory capacity required for the specific program and the memory capacity required for the at least one program exceeds the available memory capacity of the video device.

21. The video device according to claim 20, wherein the controller is configured to perform a control operation to output a warning message indicating that the specific program has not been recorded.

22. The video device according to claim 12, wherein the video device includes a memory configured to store a program.

23. The video device according to claim 12, wherein the video device is a Personal Video Recorder (PVR).

* * * * *